United States Patent
Ouchi

(10) Patent No.: US 11,191,113 B2
(45) Date of Patent: Nov. 30, 2021

(54) COMMUNICATION DEVICE, METHOD, AND STORAGE MEDIUM

(71) Applicant: CANON KABUSHIKI KAISHA, Tokyo (JP)

(72) Inventor: Masatomo Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/823,468

(22) Filed: Mar. 19, 2020

(65) Prior Publication Data

US 2020/0221516 A1 Jul. 9, 2020

Related U.S. Application Data

(63) Continuation of application No. PCT/JP2018/026119, filed on Jul. 11, 2018.

(30) Foreign Application Priority Data

Sep. 25, 2017 (JP) .............................. JP2017-183834

(51) Int. Cl.
| | | |
|---|---|---|
| H04W 76/11 | (2018.01) | |
| H04W 8/24 | (2009.01) | |
| H04W 12/06 | (2021.01) | |
| H04W 80/02 | (2009.01) | |

(52) U.S. Cl.
CPC ............ *H04W 76/11* (2018.02); *H04W 8/24* (2013.01); *H04W 12/06* (2013.01); *H04W 80/02* (2013.01)

(58) Field of Classification Search
CPC ....... H04W 76/11; H04W 8/24; H04W 12/06; H04W 80/02

USPC ......................................................... 370/329
See application file for complete search history.

(56) References Cited

U.S. PATENT DOCUMENTS

| | | | | |
|---|---|---|---|---|
| 10,299,156 | B2 | 5/2019 | Jeong et al. | |
| 2003/0177267 | A1* | 9/2003 | Orava | H04L 61/2038 709/245 |
| 2010/0061294 | A1* | 3/2010 | Proctor, Jr. | G06Q 30/0601 370/328 |
| 2013/0070627 | A1* | 3/2013 | Chen | H04W 74/08 370/252 |
| 2014/0376519 | A1* | 12/2014 | Yang | H04L 61/6022 370/336 |

(Continued)

FOREIGN PATENT DOCUMENTS

JP          2015-526011 T          9/2015

OTHER PUBLICATIONS

IEEE P802.11ax/D0.1, Mar. 2016.

(Continued)

*Primary Examiner* — Mong-Thuy T Tran
(74) *Attorney, Agent, or Firm* — Venable LLP

(57) ABSTRACT

A communication device, which complies with an IEEE802.11 standard and performs communication by assigning an Association identifier (AID) to a partner device, determines the AID to be assigned to the partner device from a first range of AID values if the partner device is a first device compatible with a frame that is transmitted with a destination designated by a range of the AID, and determines the AID to be assigned to the partner device from a second range different from the first range if the partner device is a second device not compatible with the frame that is transmitted with the destination designated by the range of the AID.

9 Claims, 11 Drawing Sheets

(56) References Cited

U.S. PATENT DOCUMENTS

| | | | |
|---|---|---|---|
| 2016/0182167 A1* | 6/2016 | Fischer | H04L 67/12 370/312 |
| 2016/0285526 A1* | 9/2016 | Hedayat | H04B 7/0452 |
| 2017/0026151 A1* | 1/2017 | Adachi | H04W 72/005 |
| 2017/0272138 A1 | 9/2017 | Chun et al. | |
| 2018/0205441 A1* | 7/2018 | Asterjadhi | H04B 7/0626 |
| 2018/0242355 A1* | 8/2018 | Lou | H04W 74/08 |

OTHER PUBLICATIONS

"Proposed Text Changes for NDP feedback report", [online], IEEE, [searched on Aug. 31, 2017], Internet (https://mentor.ieee.org/802.11/dcn/17/11-17-0073-05-00ax-cr-for-27-5-2-7-ndp-feedback-report.docx).

Cariou, Laurent et al., Proposed Text Changes for NDP feedback report, IEEE 802.11-17/0073r1, Mar. 13, 2017, p. 1-11.

International Search Report and Written Opinion issued in corresponding parent International Application No. PCT/JP2018/026119 dated Oct. 9, 2018.

* cited by examiner

FIG. 5B

| 511 | 512 | 513 | 514 | 515 | 516 | 517 | 518 | 519 |
|---|---|---|---|---|---|---|---|---|
| Trigger Type | Length | Cascade Indication | CS Required | BW | GI And LTF Type | MU-MIMO LTF Mode | Number of HE-LTF Symbols | STBC |
| Bits: 4 | 12 | 1 | 1 | 2 | 2 | 1 | 3 | 1 |

| 520 | 521 | 522 | 523 | 524 | 525 | 526 | 527 |
|---|---|---|---|---|---|---|---|
| LDPC Extra Symbol Segment | AP TX Power | Packet Extension | Spatial Reuse | Doppler | HE-SIG-A Reserved | Reserved | Trigger Dependent Common Info |
| Bits: 1 | 6 | 3 | 16 | 1 | 9 | 1 | variable |

5110

| Trigger Type subfield value | Description |
|---|---|
| 0 | Basic Trigger |
| 1 | Beamforming Report Poll |
| 2 | MU-BAR |
| 3 | MU-RTS |
| 4 | Buffer Status Report Poll |
| 5 | GCR NU-BAR |
| 6 | Bandwidth Query Report Poll |
| 7 | NDP feedback Report Poll |
| 8-15 | Reserved |

5150

| BW subfield value | Description |
|---|---|
| 0 | 20 MHz |
| 1 | 40 MHz |
| 2 | 80 MHz |
| 3 | 80+80 MHz or 160 MHz |

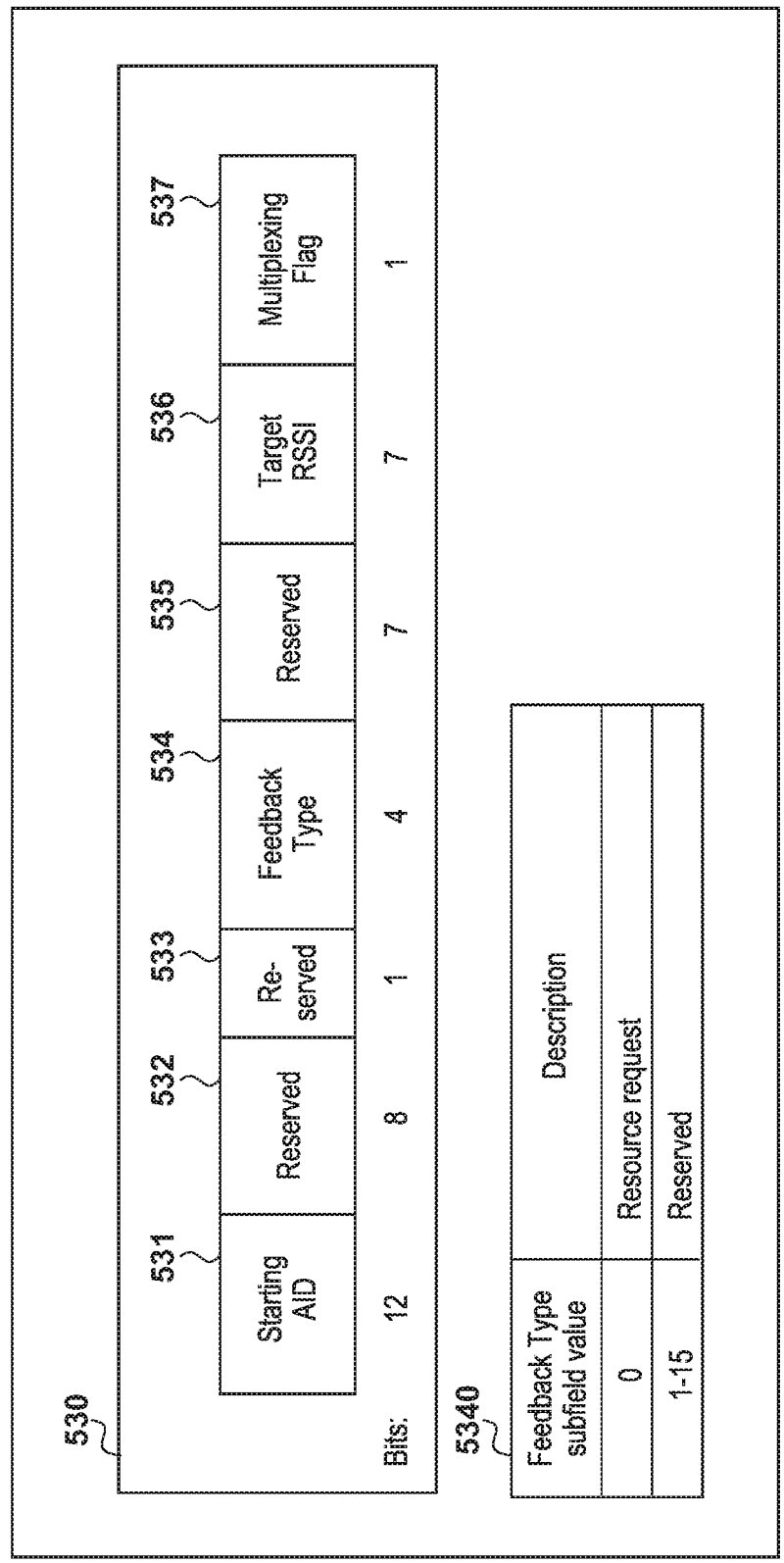

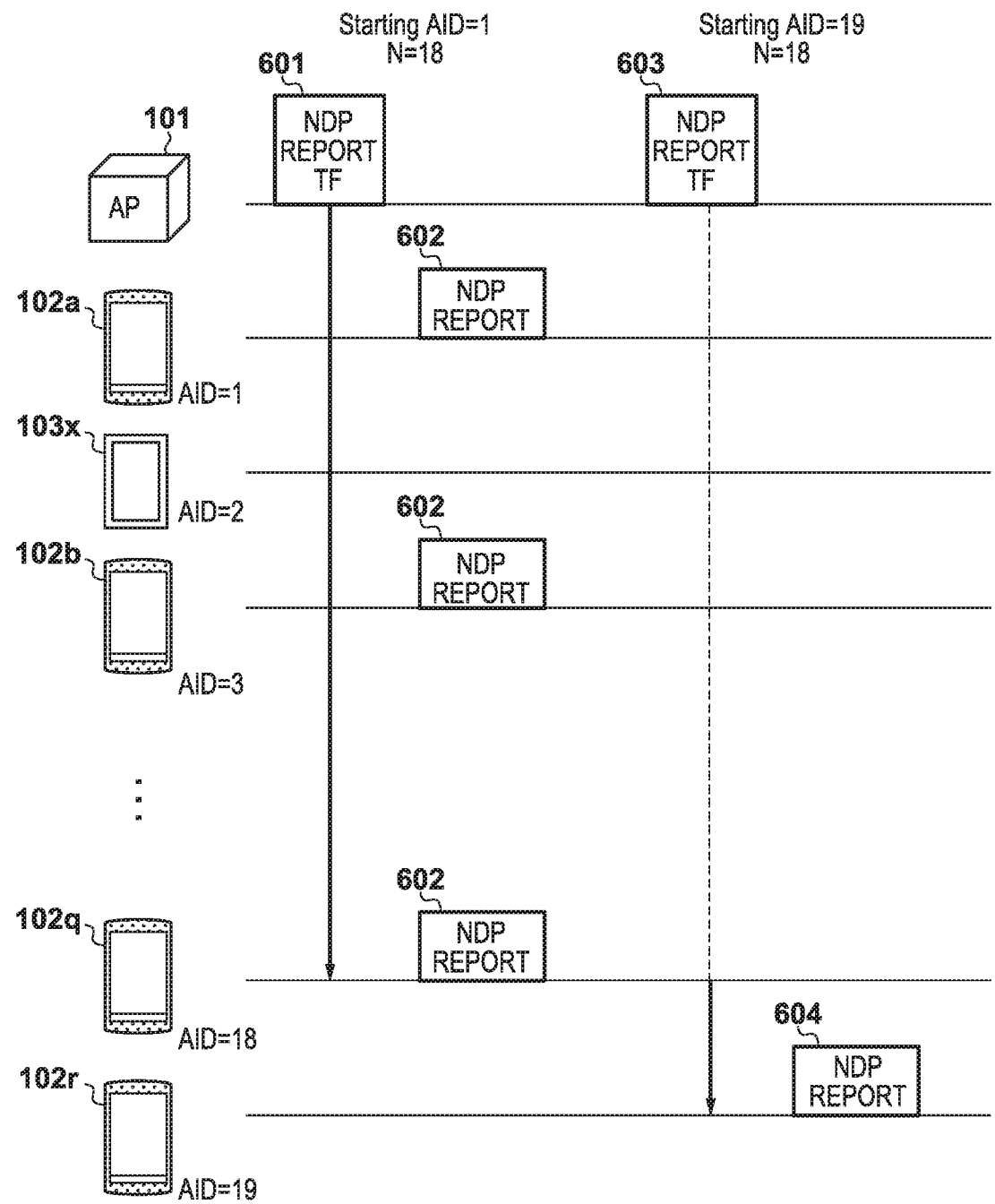

COMMUNICATION DEVICE, METHOD, AND STORAGE MEDIUM

CROSS-REFERENCE TO RELATED APPLICATIONS

This application is a Continuation of International Patent Application No. PCT/JP2018/026119, filed Jul. 11, 2018, which claims the benefit of Japanese Patent Application No. 2017-183834, filed Sep. 25, 2017, both of which are hereby incorporated by reference herein in their entirety.

BACKGROUND OF THE INVENTION

Field of the Invention

The present invention relates to a communication device, a method, and a storage medium, and more specifically, a wireless connection control technique.

Background Art

An access point of a wireless LAN complying with the IEEE802.11 standard series determines an AID (Association Identifier) upon completing association which is connection processing with a terminal, notifies the terminal of the AID, and manages the AID as identification information. PTL 1 describes a method of resetting the value of the AID.

Further, in recent years, the IEEE802.11ax standard for effective use of a wireless medium has been issued as a draft standard (NPTL 1). NPTL 1 defines a method in which reception of an activation signal called a trigger frame (TF) from an access point leads a plurality of terminals to transmit frames at a time. Note that regarding the TF, several types of TFs have been proposed according to their applications. NPTL 2 describes a method of indicating the destinations of the TF using the range of the AID (for example, the range from "the Starting AID" to "the Starting AID plus a specified number").

In general, after a new standard is issued, there is a situation in which terminals that comply with the new standard and terminals that do not comply with it coexist. A similar situation is expected to occur for the IEEE802.11ax standard. At this time, a noncompliant terminal that does not comply with the IEEE802.11ax standard cannot interpret the TF. Therefore, even if its AID is designated by being included in the destination range of the TF by the method described in NPTL 2, the noncompliant terminal transmits no signal as a response. As a result, a situation occurs in which among the terminals designated by the TF, a terminal that can transmit a response and a terminal that cannot interpret the TF and transmit a response coexist. This can degrade the communication efficiency and the frequency use efficiency of the entire system.

CITATION LIST

Patent Literature

PTL 1: Japanese PCT National Publication No. 2015-526011

Non Patent Literature

NPTL 1: IEEE P802.11ax/D0.1, MARCH 2016
NPTL 2: "Proposed Text Changes for NDP feedback report", [online], IEEE, [searched on Aug. 31, 2017], Internet (https://mentor.ieee.org/802.11/dcn/17/11-17-0073-05-00ax-cr-for-27-5-2-7-ndp-feedbackreport.docx)

SUMMARY OF THE INVENTION

The present invention provides a technique for improving the communication efficiency.

A communication device according to an aspect of the present invention is a communication device that complies with an IEEE802.11 standard and performs communication by assigning an Association identifier (AID) to a partner device, the communication device being configured to determine the AID to be assigned to the partner device from a first range of AID values if the partner device is a first device compatible with a frame that is transmitted with a destination designated by the range of the AID, and determine the AID to be assigned to the partner device from a second range different from the first range if the partner device is a second device not compatible with the frame that is transmitted with the destination designated by the range of the AID.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5B is a view showing the example of the structure of the TF and the details of information elements stored therein.

FIG. 5C is a view showing the example of the structure of the TF and the details of information elements stored therein.

FIG. 6 is a view showing an NDP report communication procedure.

DESCRIPTION OF THE EMBODIMENTS

Embodiments of the present invention will be explained below with reference to the accompanying drawings.

(Network Configuration)

Figure 1:
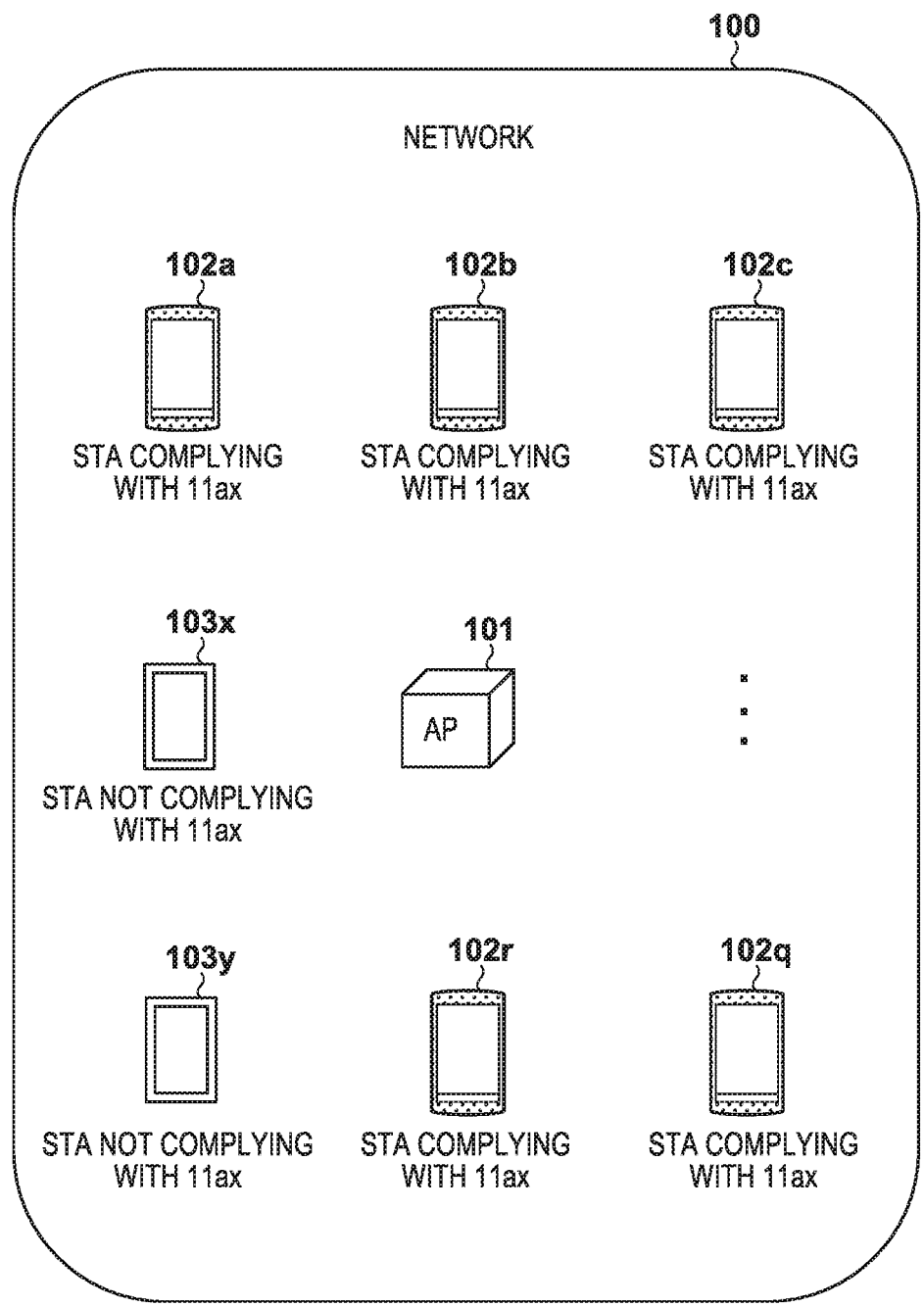
FIG. 1 is a view showing a configuration example of a wireless communication network.

FIG. 1 shows the configuration of a wireless communication network 100 according to this embodiment. In an example, the wireless communication network 100 is a wireless LAN including an access point (AP 101) and terminals (STAs 102 and STAs 103). Note that each of the AP 101, the STA 102, and the STA 103 is a wireless communication device that can communicate according to at least any one standard of the IEEE802.11 standard series. Here, it is assumed that the AP 101 and the STA 102 comply with at least the IEEE802.11ax standard and the STA 103 does not comply with the IEEE802.11ax standard. The AP 101 and the STA 102 may comply with another IEEE802.11 standard other than the IEEE802.11ax standard. Note that the subscripts of the alphabetical characters attached to the reference numerals correspond to the number of the respective devices. In the example shown in FIG. 1, it is shown that there are eighteen STAs 102 including an STA 102a to an STA 102r, and two STAs 103 including an STA 103x and an STA 103y. However, the number of the devices is merely an example, and there can be a larger or smaller number of devices than that in the example shown in FIG. 1. In this embodiment, a description will be given in the context of the wireless LAN complying with the IEEE802.11 standard series, but the following description is applicable to another wireless communication system having the similar functions.

(Device Arrangement)

Figure 2:
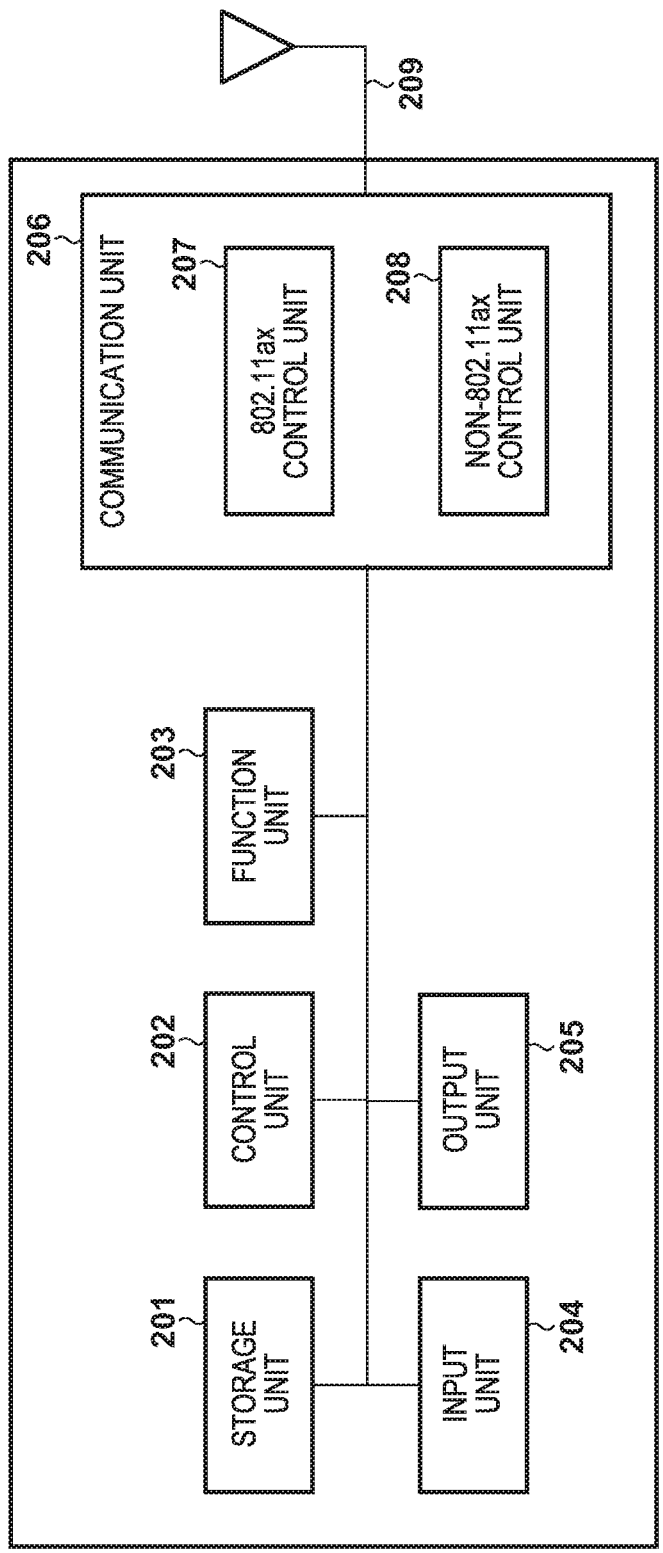
FIG. 2 is a block diagram showing an arrangement example of a communication device.

FIG. 2 shows an arrangement example of the hardware of the AP 101 described above. Note that in an example, the AP 101 includes a storage unit 201, a control unit 202, a function unit 203, an input unit 204, an output unit 205, a wireless LAN control unit 206, an 802.11ax control unit 207, and a non-802.11ax control unit 208.

The storage unit 201 is, for example, configured to include a memory such as a ROM or a RAM, and stores programs for causing the AP 101 to perform various kinds of operations to be described later and various kinds of information such as communication parameters for wireless communication. Note that the storage unit 201 may include, other than the memory such as a ROM or a RAM, for example, a storage medium such as a flexible disk, a hard disk, an optical disk, a magnetooptical disk, a CD-ROM, a CD-R, a magnetic tape, a non-volatile memory card, or a DVD. Further, the storage unit 201 may be formed by a plurality of memories or the like.

The control unit 202 is formed by a processor such as a CPU (Central Processing Unit) or an MPU (Micro Processing Unit), and executes the programs stored in the storage unit 201, thereby controlling the entire AP 101. Note that the control unit 202 may control the AP 101 by cooperation of the programs stored in the storage unit 201 and an OS (Operating System). Further, the control unit 202 may be formed by a plurality of processors such as a multicore processor.

In addition, the control unit 202 controls the function unit 203 to execute predetermined processing such as an AP function, printing, or projection. The function unit 203 is hardware used by the AP 101 to execute predetermined processing. For example, if the AP 101 is a camera, the function unit 203 can be an image capturing unit, if the AP 101 is a printer, the function unit 203 can be a printing unit, and if the AP 101 is a projector, the function unit 203 can be a projection unit. Note that the function unit 203 can implement not only one function but also a plurality of functions.

The input unit 204 accepts various kinds of operations from a user. The output unit 205 performs various kinds of outputs for the user. Here, the output by the output unit 205 includes at least one of display on a screen, audio output by a loudspeaker, vibration output, and the like. Note that both the input unit 204 and the output unit 205 may be implemented by one module, like a touch panel.

The communication unit 206 controls wireless communication complying with the IEEE802.11 standard series or Wi-Fi®, or controls IP (Internet Protocol) communication. For example, the communication unit 206 can perform either one of communication complying with the IEEE802.11ax and communication not complying with the IEEE802.11ax by switching the 802.11ax control unit 207 and the non-802.11ax control unit 208 to function. Note that the 802.11ax control unit 207 or the non-802.11ax control unit 208 can be a logical unit implemented by software using a common communication circuit or the like. In addition, the 802.11ax control unit 207 or the non-802.11ax control unit 208 can be a separated physical unit implemented by a dedicated communication circuit or the like and corresponding software. The communication unit 206 controls an antenna 209 to transmit/receive a radio signal for wireless communication.

Note that each of the STA 102 and the STA 103 can include the arrangement similar to that shown in FIG. 2 described above. However, some functions may be omitted or a functional component not included in the arrangement shown in FIG. 2 may be added. For example, the STA 103 can be configured to include no 802.11ax control unit 207.

(Procedure of Processing)

Next, connection processing generally executed in the IEEE802.11 standard series will be described with reference to FIG. 3.

First, a terminal (STA) transmits a Probe Request frame (step S301). An AP transmits a Probe Response frame to the STA in response to the Probe Request (step S302). Then, the STA transmits an Authentication Request frame (step S303), and the AP transmits an Authentication Response frame to the STA in response to the Authentication Request (step S304). Thereafter, the STA transmits an Association Request frame (step S305). The AP determines an AID (Association identifier) of the STA (step S306), and transmits an Association Response frame including AID information elements to the STA (step S307). Note that in the IEEE802.11ax standard, HE (High Efficiency) MAC (Media Access Control) Capabilities information is exchanged in the Association Request/Response.

Figure 3:
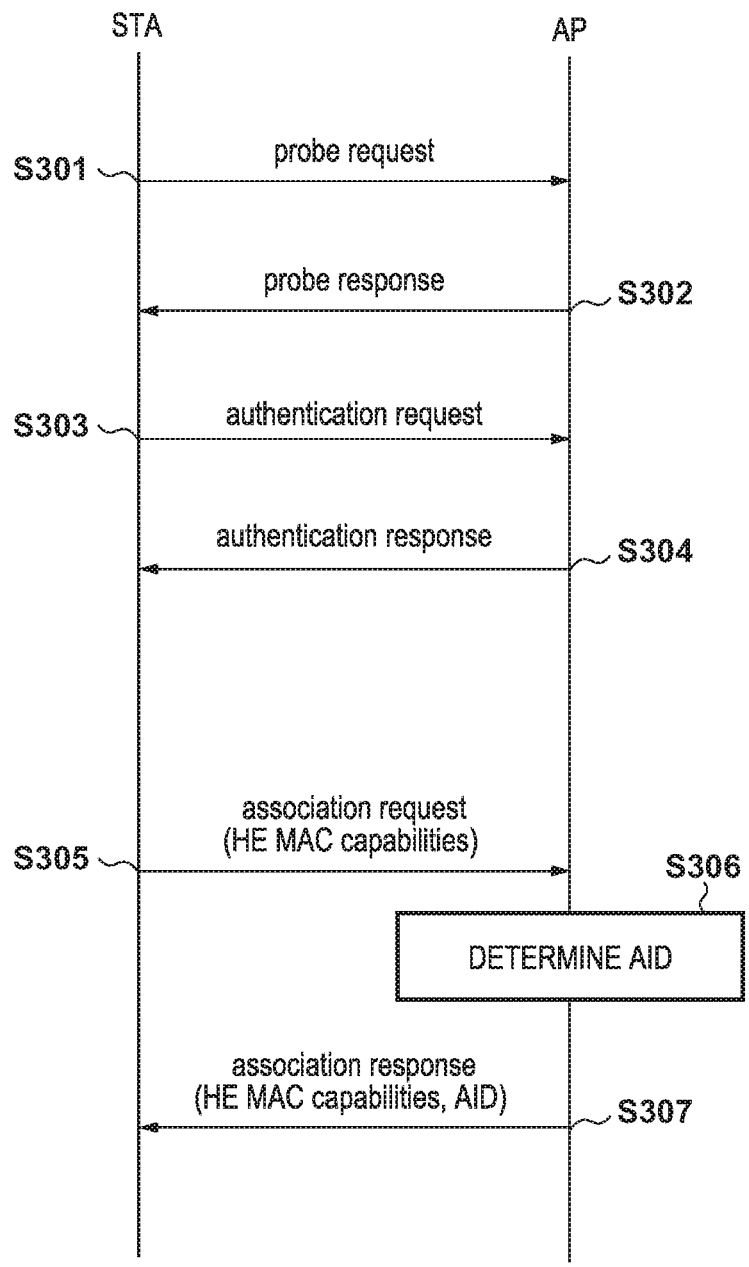
FIG. 3 is a view showing a connection procedure in the IEEE802.11 standard series.

After the processing shown in FIG. 3, the AP uses the AID determined in step S306 and the STA uses the AID notified in step S307, that is, the common AID is used between the AP and the STA to perform communication control. For example, if data whose destination is a terminal in power saving is acquired, the AP subsequently transmits a beacon in which a bit corresponding to a TIM (Traffic Indication MAP) region is set to 1. Upon receiving this beacon, the STA transmits a PS-Poll or Null frame to the AP if the bit corresponding to its AID in the TIM region is 1.

Figure 4:
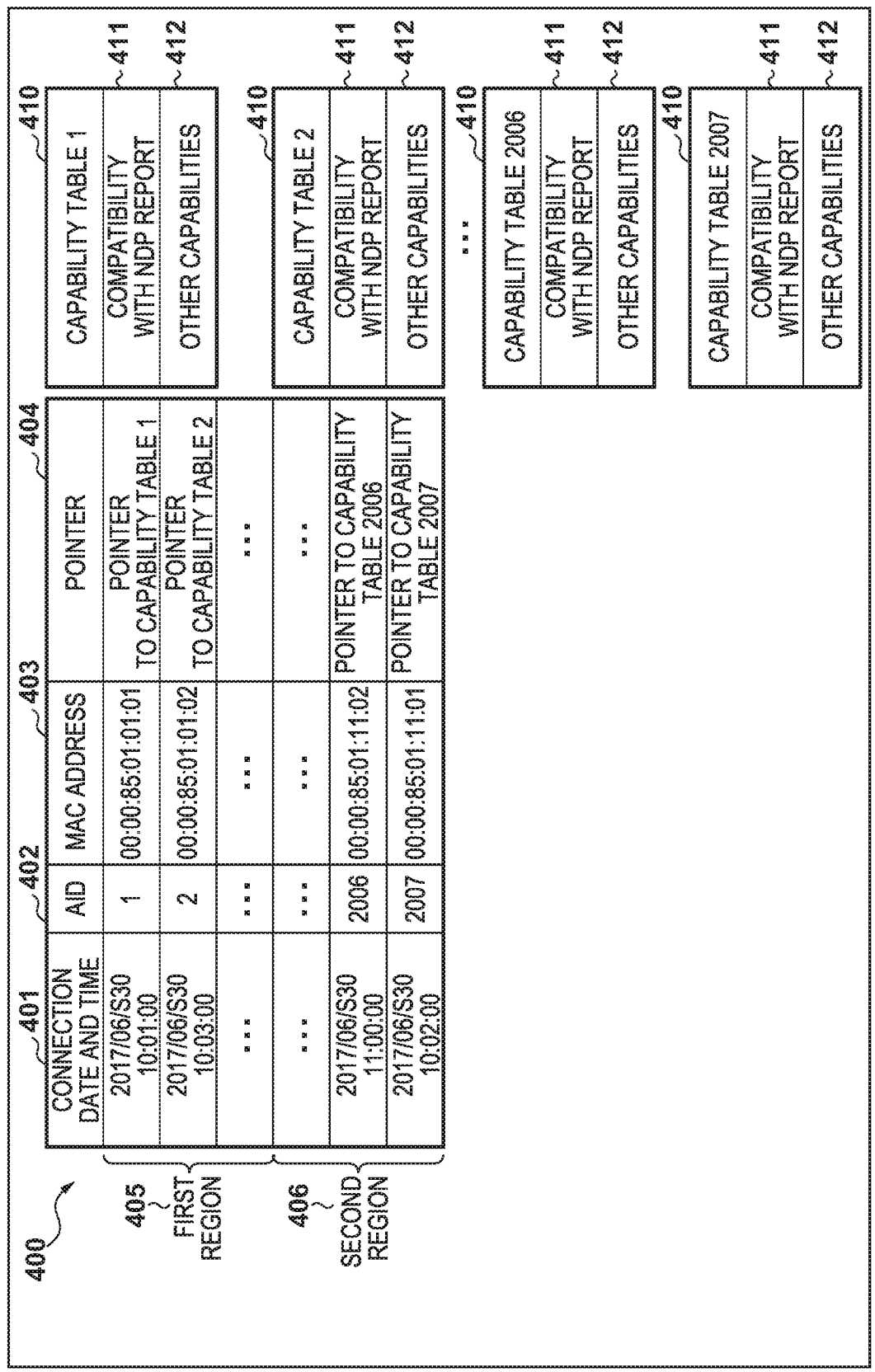
FIG. 4 is a view showing an example of an STA management table managed by an AP.

The AP manages STA information to perform communication with the STA to which the AID has been assigned. FIG. 4 is a view schematically showing an STA management table 400 managed by the AP. In FIG. 4, the AP holds four items of information for one STA in the STA management table 400. For example, the STA management table 400 includes a record (row) including four fields as information of one STA. Note that the number of records corresponds to the maximum number of the STAs to which the AP is connectable. For example, when a connection with one STA is established, information of the STA is stored in one empty record, or information of the STA is overwritten on the oldest record.

The four fields included in each record include, for example, a connection date and time field 401, an AID field 402, a MAC address field 403, and a pointer field 404. The connection date and time field 401 stores information indicating the connection start date and time with the corresponding STA, for example, transmission date and time information of the Association Response in step S307 in FIG. 3. The AID field 402 stores the AID of the corresponding STA. In the current IEEE802.11 standard, the AID can take a value from 0 to 2007. However, "0" is a specific value indicating an arbitrary STA. When individually designating the connected STA, a numerical value from 1 to 2007 is used. The MAC address field 403 stores the MAC address having a length of 6 octets (bytes) for the corresponding STA. The pointer field 404 stores a pointer to a capability table 410 which stores capability information of the corresponding STA. The AP 101 can use the pointer to specify the capability information of each STA.

The capability table 410 includes a field 411 indicating whether the STA is compatible with an NDP feedback report poll TF, and a field 412 indicating other capabilities. Note the detailed description of the other capabilities is omitted since they are not directly related to the description of this embodiment, but they can include, for example, a supported bandwidth (20/40/80/160 MHz), modulation and coding scheme (MCS), or the like.

Here, the NDP feedback report poll TF whose compatibility is indicated by the field 411 indicating whether the STA is compatible with the NDP feedback report poll TF will be described. Note that an NDP is a Null Data Packet, and a TF is a Trigger Frame. In the NDP feedback report poll TF, the destination can be designated by the range of the AID. In this case, the range of the AID is designated by "the Starting AID" which is the lower limit value of the range and "the Starting AID plus a specified number (N)" which is the upper limit value of the range. This TF is used by the AP to acquire a small amount of information from a large number of STAs, and a response to this TF is transmitted in an NDP format in which no data portion (payload portion) exists. Hereinafter, an NDP feedback report poll TF is referred to as an "NDP report TF", and a response to an NDP feedback report poll TF is referred to as an "NDP report".

Figure 5A:
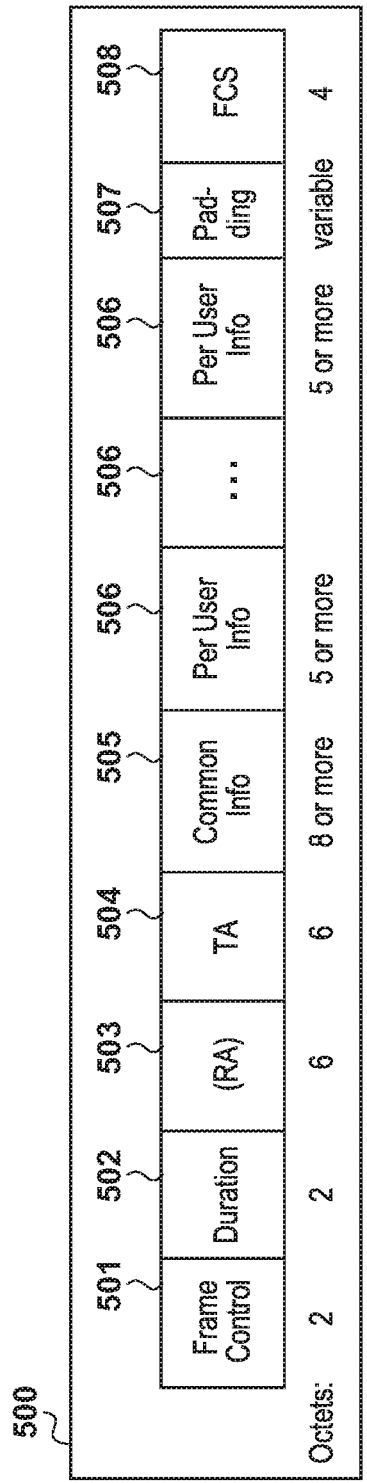
FIG. 5A is a view showing an example of the structure of a TF and the details of information elements stored therein.

First, the frame format of an NDP report TF is shown in FIG. 5A. A TF 500 shown in FIG. 5A schematically shows the structure of the TF. Note that each element is used for an application defined in at least any one standard of the IEEE802.11 standard series. The elements related to the description in this embodiment will be described below in detail, and for other elements, only their names and lengths will be shown.

In this embodiment, a Frame Control field 501 is a field that stores a value indicating that the TF 500 is a Trigger Frame of the IEEE802.11ax, and has a length of 2 octets. A Duration field 502 is a field having a length of 2 octets. An RA field 503 is a field that has a length of 6 octets and stores a Receiver Address. A TA field 504 is a field that has a length of 6 octets and stores a Transmitter Address. A Common Info field 505 is a field indicating information common to a plurality of terminals that are destinations of this TF, and has a length of 8 octets or more. The details of the Common Info field 505 will be described later with reference to FIG. 5B. A Per User Info field 506 is a field indicating individual information for the destination of this TF, and has a length of 5 octets or more. The details of the Per User Info field 506 will be described later with reference to FIG. 5C. A Padding 507 is a variable-length padding area for making the length of this TF a multiple of 4 octets. An FCS 508 is a Frame Check Sequence added for error detection/correction.

Next, the details of the Common Info field 505 will be described. In FIG. 5B, information 510 schematically shows the details of the Common Info field 505.

A Trigger Type subfield 511 is a subfield having a length of 4 bits, and as shown in a table 5110, the trigger type is specified in accordance with the value of the subfield. As shown in the table 5110, in a case of an NDP report TF, the value of the Trigger Type 511 is set to 7. A Length subfield 512, a Cascade Indication subfield 513, and a CS (Carrier Sense) Required subfield 514 are subfields having a length of 12 bits, a length of 1 bit, and a length of 1 bit, respectively. A BW (Bandwidth) subfield 515 is a subfield having a length of 2 bits, and as shown in a table 5150, the frequency bandwidth to be used is specified in accordance with the value of the subfield. For example, when the frequency bandwidth to be used is 20 MHz, the value of the BW subfield 515 is set to 0. A GI And LTF Type (Guard Interval And Long Training Field) subfield 516 is a subfield having a length of 2 bits. An MU-MIMO LTF Mode subfield 517 and a Number of HE LTF Symbols subfield 518 are subfields having a length of 1 bit and a length of 3 bits, respectively. An STBC (Space Time Block Code) subfield 519 is a subfield having a length of 1 bit. An LDPC (Low Density Parity Check) Extra Symbol Segment subfield 520 is a subfield that is, for example, arranged after the STBC subfield 519 and has a length of 1 bit. An AP TX Power subfield 521 is a subfield having a length of 6 bits. A Packet Extension subfield 522 is a subfield having a length of 3 bits. A Spatial Reuse subfield 523 is a subfield having a length of 16 bits. A Dropper subfield 524 is a subfield having a length of 1 bit. An HE-SIG-A Reserved subfield 525 is a subfield having a length of 9 bits. A subfield 526 is a Reserved subfield having a length of 1 bit. A Trigger Dependent Common Info subfield 527 is a subfield whose length is variable (variable length).

Next, the details of the Per User Info field 506 will be described. In FIG. 5C, information 530 schematically shows the details of the Per User Info field 506.

A Starting AID subfield 531 is a subfield indicating the start value of the range of the AID used as the destination of this TF, and has a length of 12 bits. Subfields 532, 533, and 535 are Reserved subfields. A Feedback Type subfield 534 is a subfield having a length of 4 bits, and as shown in a table 5340, the value of this subfield is set to 0 when the TF is used as a Resource Request. A Target RSSI (Receive Signal Strength Indicator) subfield 536 and a Multiplexing Flag subfield 537 are subfields having a length of 7 bits and a length of 1 bit, respectively.

Here, a destination terminal of the NDP report TF having the frame structure as described above will be described. The terminal to be the destination of the NDP report TF is a terminal whose AID is included in a range having the value of the Starting AID subframe 531 described above as a start value (minimum value) and a fixed width (the width determined by a predetermined value N). That is, a terminal whose AID value is included in a value range from a first value set in the Starting AID subframe 531 to a second value represented by (the first value+N−1) is designated as the destination of the NDP report TF. Here, the predetermined value N is specified as a product of a constant k, (a value set in the BW subfield 515)+1, and (a value set in the Multiplexing Flag subfield 537). The constant k is determined in accordance with the usage of the tone on a wireless medium by the NDP started by the NDP report TF. If a value set in the BW subfield 515 is 0 (20 MHz) or 1 (40 MHz), k=18.

The Multiplexing Flag subfield 537 is determined in accordance with the number of streams used in the NDP. For example, if the NDP is transmitted in the 20-MHz band (the value set in the BW subfield 515 is 0, and therefore k=18) and using one stream (the value set in the Multiplexing Flag subfield 537 is 1), N=18×(0+1)×1=18. This corresponds to that the destinations of this NDP report TF are eighteen terminals. For example, if the Starting AID is 1, the terminals with the AIDs from 1 to 18 are targets of this NDP report TF.

Next, with reference to FIG. 6, an NDP report communication procedure using a conventional NDP report TF will be described. In FIG. 6, a plurality of STAs are displayed such that the earlier the connection time is, the higher the STA is arranged. The AID is assigned to each AP in the order of connection time. In the example shown in FIG. 6, the STA 102a complying with the IEEE802.11ax standard is connected to the AP 101 first, and 1 is assigned as its AID. Then, the STA 103x not complying with the IEEE802.11ax standard is connected to the AP 101, and 2 is assigned as its AID. Subsequently, the STAs 102b to 102r complying with the IEEE802.11ax standard are connected to the AP 101, and 3 to 19 are assigned as their AIDs, respectively.

First, the AP 101 transmits, to the surroundings, an NDP report TF 601 in which the Trigger Type subfield 511 is set to 7 and the Feedback Type subfield 534 is set to 1. Upon receiving the NDP report TF 601, the STA 102 determines whether the STA 102 itself is a destination of this TF. If the STA 102 itself is a destination of this TF, the STA 102 transmits an NDP report frame 602 to the AP 101. Note that if the STA 102 itself is a destination of this TF, the STA 102 extracts the value set in the Feedback Type subfield 534, and if the value indicates that the TF is a Resource Request, the STA 102 checks its transmission buffer amount. Then, the STA 102 sets, in NDP_REPORT and RU_TONE_SET of a TxVECTOR/RxVECTOR parameter in the physical layer (PHY layer) of the NDP report frame 602, information indicating whether its transmission buffer amount is equal to or larger than a threshold. Note that since the STA 103 does not comply with the IEEE802.11ax standard, it does not execute the determination and response as described above.

Here, the Starting AID of the NDP report TF 601 is 1, and the specified number indicating the number of target terminals is 18 in this example. At this time, the seventeen STAs from the STA 102a to the STA 102q have the AIDs within the range of 1 to 18, so that each STA transmits the NDP report frame 602. On the other hand, the STA 102r whose AID is 19 is not included in the destination range of the NDP report TF 601, so the STA 102r returns no NDP report even though it receives the NDP report TF 601.

Next, the AP 101 transmits an NDP report TF 603 with the Starting AID=19. The dashed line in FIG. 6 represents that the STAs 102a to 102q whose AIDs are 1 to 18 are not the destinations of the NDP report TF 603. The STA 102r returns an NDP report frame 604 in response to the NDP report TF 603. Note that the AP 101 returns no acknowledgement (Ack) for the NDP report frames 602 and 604.

In this manner, according to the NDP report procedure described above, the AP 101 can acquire a small amount of information from a large number of the STAs 102 and grasp the state of each STA by transmitting one TF.

On the other hand, in the example shown in FIG. 6, in order to acquire information from the eighteen STAs 102 complying with the IEEE802.11ax standard, two NDP report TFs, each of which is capable of acquiring information from a maximum of eighteen STAs at a time, are transmitted. That is, since the AID of the STA 103 not complying with the IEEE802.11ax is included in the range of the AID serving as the destination of the NDP report TF, the number of transmissions of the NDP report TFs has increased. Such an increase in the number of transmissions of the NDP report TFs can cause degradation in communication efficiency and frequency use efficiency.

In this embodiment, such an increase in the number of transmissions of the NDP report TFs is suppressed. For this purpose, the AID to be assigned to the STA 103 not complying with the IEEE802.11ax standard is managed separately from the AID to be assigned to the STA 102 complying with the IEEE802.11ax standard. Thus, consecutive AID values within a predetermined range are assigned to the STAs 102 complying with the IEEE802.11ax standard, and any AID value within the predetermined range is prevented from being assigned to the STA 103 not complying with the IEEE802.11ax standard. This suppresses the number of NDP report TFs that should be transmitted to collect information from the STAs 102 complying with the IEEE802.11ax standard. The details of this processing will be described below.

Figure 7:
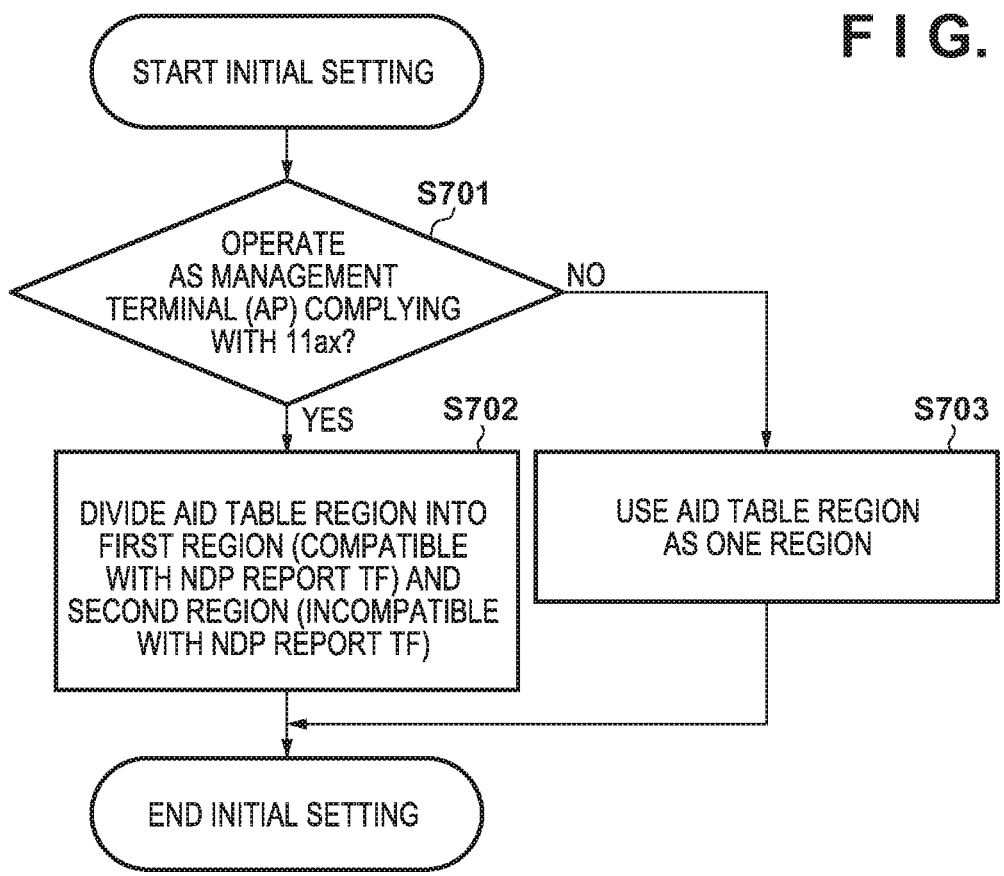
FIG. 7 is a flowchart showing an example of the procedure of initial setting processing executed by the AP.

First, with reference to FIG. 7, initial setting processing executed in the AP 101 will be described. This processing is, for example, implemented by the control unit 202 executing a program stored in the storage unit 201. Note that a part or all of this processing may be implemented by dedicated hardware or the like.

First, the AP 101 determines whether to operate as a management device (access point) complying with the IEEE802.11ax (step S701). If it is determined to operate complying with the IEEE802.11ax (YES in step S701), the AP 101 separates the AID management table into a first region 405 and a second region 406 as shown in FIG. 4 and manages them (step S702). Here, the AP 101 sets the first region as a region for the STAs complying with the IEEE802.11ax, and sets the second region as a region for the STAs not complying with the IEEE802.11ax. Note that the AID values included in the first region are not included in the second region, and the AIDs included at least in the first region include a plurality of consecutive values over a predetermined range. For example, in the value range of the AID, the range in which the MSB (Most Signification Bit) is 0 may be set to be the first region, and the range in which the MSB is 1 may be set to be the second range. Note that each of the number of the AIDs included in the first region and the number of the AIDs included in the second region may be settable. On the other hand, if it is determined not to operate complying comply with the IEEE802.11ax (NO in step S701), the AP 101 uses the AID management table as one region (step S703). In this manner, in a situation in which an NDP repot TF can be transmitted (a situation in which the AP 101 operates complying with the IEEE802.11ax), the AP 101 divides the AID management table and prepares for separately managing the divided regions in the initial setting.

Next, with reference to FIG. 8, processing executed by the AP 101 for determining the AID of the STA in connection processing if the AP 101 operates complying with the IEEE802.11ax will be described. This processing corresponds to step S306 in FIG. 3. This processing is, for example, implemented by the control unit 202 executing a program stored in the storage unit 201. Note that a part or all of this processing may be implemented by dedicated hardware or the like.

First, the AP 101 determines whether the STA requesting a connection complies with an NDP report TF (step S801). This is determined by, for example, determining whether the target STA is an HE (High Efficiency) STA. In addition, this may be determined by checking the NDP feedback report support bit of the information element (Information field) of the capability information (HE MAC Capabilities) received from the target STA. Note that the information indicating whether the STA is an HE STA or the information of HE MAC Capabilities is included in, for example, a Probe Request, an Authentication Request, or an Association Request. However, the present invention is not limited to this, and another signal may inform the AP 101 of these pieces of information. Note that if the NDP report procedure is defined as the essential function of the IEEE802.11ax standard, determination as to whether an STA is compatible with the NDP report TF is synonymous with determination as to whether the STA is an HE STA. On the other hand, if the NDP report procedure is not defined as the essential function of the IEEE802.11ax standard, it can happen that an STA, which complies with the IEEE802.11ax standard, is not compatible with the NDP report TF.

If the target STA is compatible with the NDP report TF (YES in step S801), the AP 101 assigns an AID value from the first region to the STA (step S802). The value assigned here is determined, for example, to be a value obtained by adding 1 to the AID value previously assigned in the connection procedure with another STA complying with the NDP report TF. That is, assignment is performed such that a plurality of AID values assigned from the first region are consecutive values. On the other hand, if the target STA is not compatible with the NDP report TF (NO in step S801), the AP 101 assigns an AID value from the second region to the STA (step S803). Note that the rule for assigning the AID from the second region is not particularly limited.

Note that the first region can be an arbitrary range from 1 to 2007. In addition, if the AIDs from the first region are assigned starting from 2007, when assigning the AID from the first region, the AP 101 can assign a value obtained by subtracting 1 from the value previously assigned. In addition, the AP 101 may use another assignment method such as a method in which, for example, 1000 is first assigned as the AID value, 999 is assigned in the next assignment, and 1001 is assigned in the further next assignment. In either case, the AP 101 can perform assignment of the AID such that the value assigned from the first region becomes a consecutive value.

Figure 9:
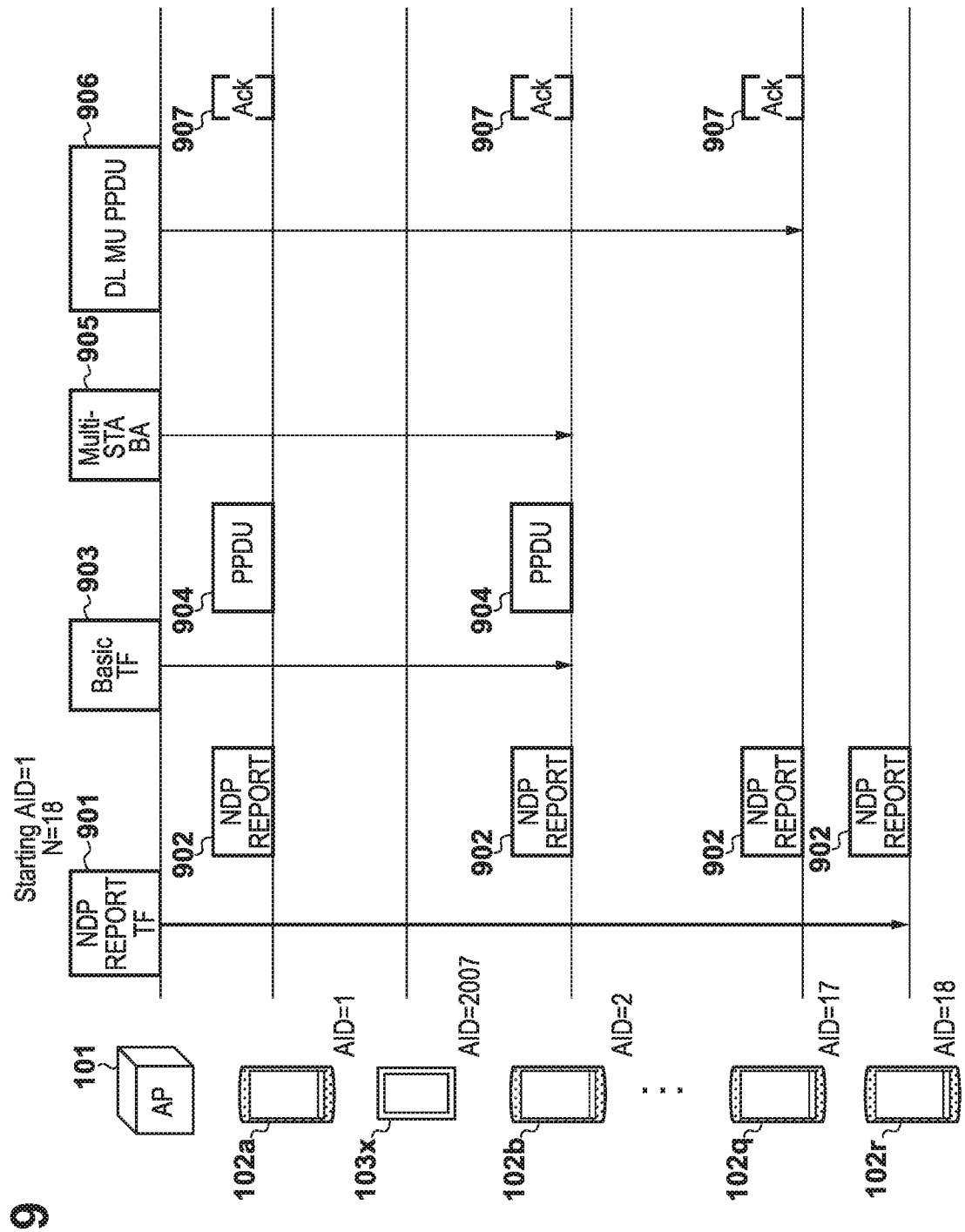
FIG. 9 is a view showing an example of an NDP report communication procedure according to the embodiment.

Next, an example of the NDP report communication procedure according to this embodiment will be described with reference to FIG. 9. Here, for the sake of comparison, the connection order of each STA is assumed to be similar to that shown in FIG. 6. Further, it is assumed that all of the STAs 102a to 102r complying with the IEEE802.11ax standard are compatible with the NDP report TF. Furthermore, it is assumed that the AP 101 operates complying with the IEEE802.11ax standard. Therefore, it is assumed that the AP 101 has executed the processing shown in FIG. 7 and divided the AID table region into the first region including values of 1 to X (X≥18) and the second region including values of X+1 to 2007.

Figure 8:
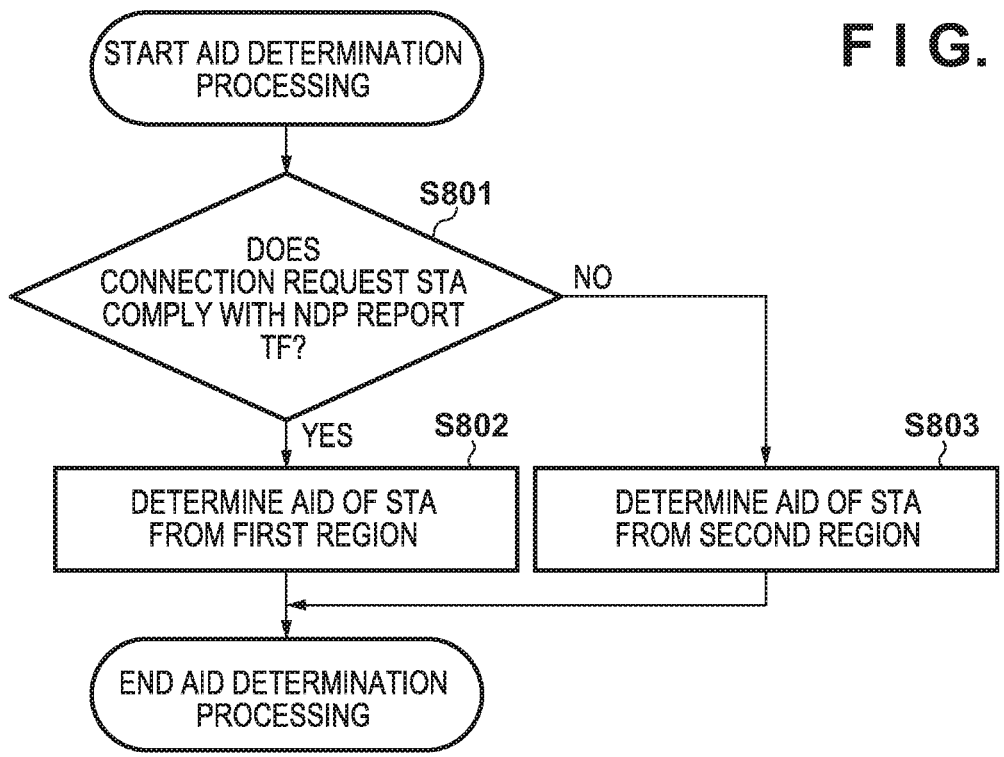
FIG. 8 is a flowchart showing an example of the procedure of AID determination processing according to an embodiment.

In this case, by the procedure shown in FIG. 8, the AP 101 assigns the AID=1 from the first region to the STA 102a that is compatible with the NDP report TF, and then assigns the AID from the second region to the STA 103x. Here, it is assumed that the AP 101 has assigned the AID=2007 from the second region to the STA 103x. Thereafter, in the connection procedure with the STAs 102b to 102r compatible with the NDP report TF, the AP 101 assigns the AIDs=2 to 18 from the first region to the respective STAs. That is, the consecutive AIDs=1 to 18 are assigned to the STAs 102a to 102r compatible with the NDP report TF.

In this situation, the AP 101 transmits an NDP report TF 901 with the Starting AID=1. Upon receiving the NDP report TF 901, each of the STAs 102a to 102r whose AID is included in the range of 1 to 18 transmits an NDP report frame 902. Note that the AP 101 uses the NDP report received from the STA 102 when controlling UL (UP Link) data communication in a direction from the STA 102 to the AP 101. For example, assume that, among the NDP report frames 902, each of the NDP reports from the terminal 102a and the terminal 102b indicates that "the transmission buffer amount is equal to or larger than the threshold". In this case, the AP 101 transmits, for example, a Basic trigger frame (TF) 903 whose destinations are set to be the STA 102a and the STA 102b. The Basic TF is a frame in which the Trigger Type subfield 511 is set to 0. This Basic TF is transmitted, for example, to preferentially assign a wireless resource for UL (Up Link) to the STA whose transmission buffer amount is equal to or larger than the threshold. Each of the STA 102a and the STA 102b transmits, in response to the Basic TF 903, a data PPDU (Physical layer (PHY) Protocol Data Unit) 904 staying in the transmission buffer. Upon receiving the PPDUs from the STA 102a and the STA 102b, the AP 101 returns a Multi-STA BA (BlockAck) 905. Note that if the AP 101 did not receive the NDP report frame 902 indicating that "the transmission buffer amount is equal to or larger than the threshold" from any STAs, it may transmit no Basic TF 903 but transmit DL (Down Link) data to the STAs.

For example, the AP 101 transmits DL MU (Multi User) data (DL MU PPDU 906) after transmitting the Multi-STA BA 905. Upon receiving the DL MU PPDU 906, each STA transmits an acknowledgment (Ack 907). The Ack 907 is compatible with MU (Multi User) in the case of the IEEE 802.11ax, and can be transmitted from each of a plurality of STAs 102 to the AP 101 at a time.

Figure 10:
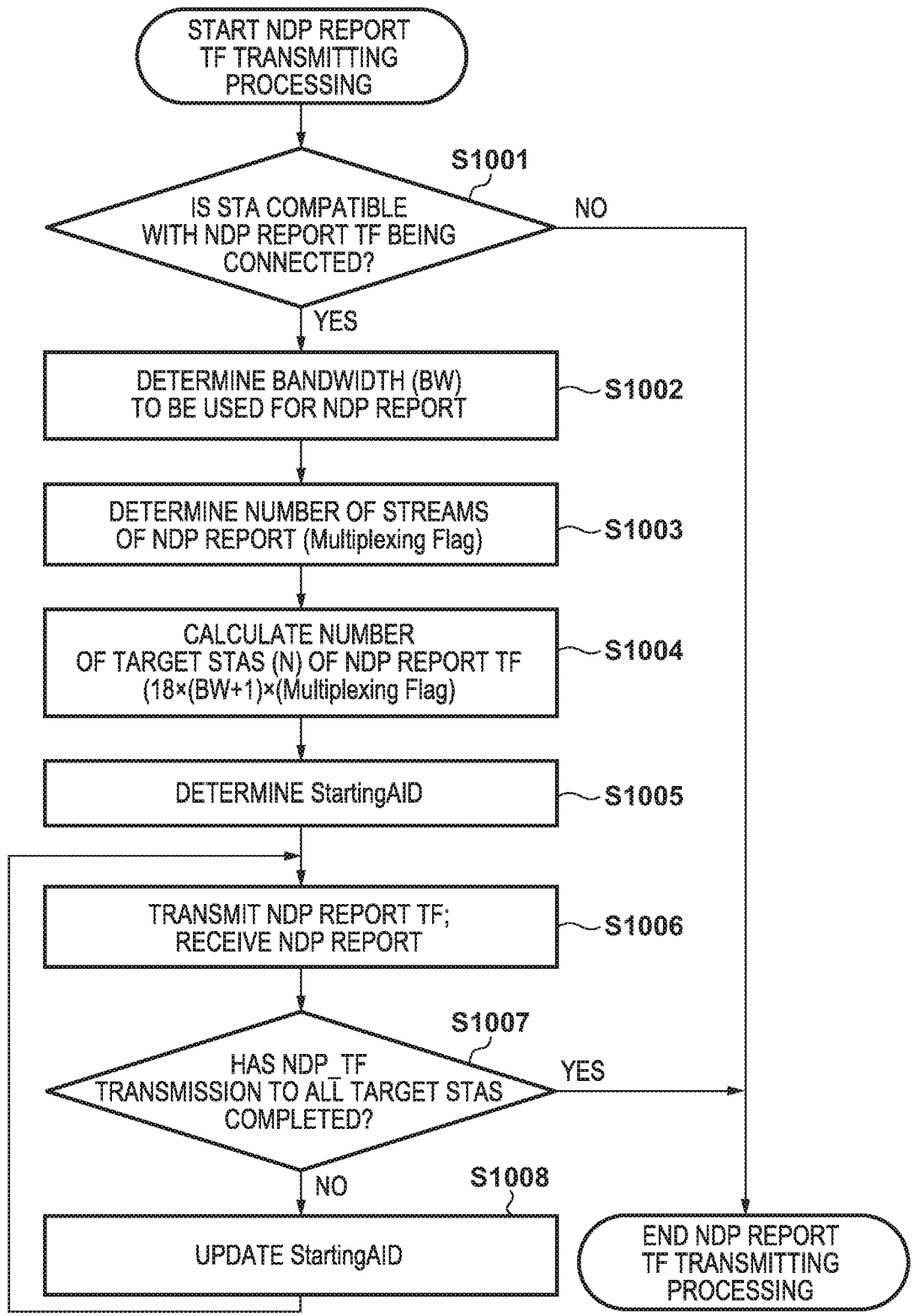
FIG. 10 is a flowchart showing an example of the procedure of NDP report TF processing according to the embodiment.

Next, an example of the procedure of processing in which the AP transmits the NDP report TF will be described with reference to FIG. 10. The processing shown in FIG. 10 is periodically executed, for example, every several tens of msec. This processing is, for example, implemented by the control unit 202 executing a program stored in the storage unit 201. Note that a part or all of this processing may be implemented by dedicated hardware or the like.

First, if a period for executing the processing shown in FIG. 10 arrives, the AP 101 determines whether the STA 102 compatible with the NDP report TF is being connected to the AP 101 (step S1001). If such an STA 102 is not being connected to the AP 101 (NO in step S1001), the AP 101 terminates the processing in this period. On the other hand, if such an STA 102 is being connected to the AP 101 (YES in step S1001), the AP 101 determines the bandwidth to be used for the NDP report, and sets the determination result in the BW subfield 515 of the NDP report TF (step S1002). The AP 101 determines the number of streams of the NDP report, and sets the determination result in the Multiplexing Flag subfield 537 of the NDP report TF (step S1003). The AP 101 calculates the specified number (N) of the targets of one NDP report TF (step S1004). Then, the AP 101 determines and sets the Starting AID 531 of the NDP report TF (step S1005). Note that the order of steps S1002 to S1005 may be changed in some cases. In addition, as to each of the values determined in steps S1002 to S1005, if it is determined in advance that a fixed value should be used, the determination processing thereof may be omitted.

Subsequently, the AP 101 transmits an NDP report TF and receives an NDP report from each STA (step S1006). Then, the AP 101 determines whether the transmission of the NDP report TF to all the STAs 102 compatible with the NDP report TF has been completed (step S1007). If it is determined that the transmission has been completed (YES in S1007), the processing shown in FIG. 10 is terminated. On the other hand, if the AP 101 determines that the transmission of the NDP report TF to all the STAs 102 compatible with the NDP report TF has not been completed (NO in step S1007), the AP 101 updates the Starting AID (step S1008), and returns to step S1006. Here, the update of the Starting AID is performed, for example, by adding the specified number (N) to the previous Starting AID.

By the processing as described above, the AP 101 according to this embodiment prevents the consecutive AIDs from being assigned to both the STA compatible with the NDP report TF and the STA not compatible with the NDP report TF. Thus, when a predetermined AID range is designated in the NDP report TF, it is possible to prevent that the STA not compatible with the NDP report TF is included in that range. As a result, it becomes possible to suppress, to a minimum number of times, the number of transmissions of the NDP report TFs necessary for collecting the NDP reports from the STAs corresponding to the NDP report TF. Here, the minimum number of times is, for example, the minimum integer number of times exceeding M/N if M STAs are the targets. For example, if N=18, once for M=1 to 18 and twice for M=19 to 36. That is, p times for M=18×(p−1)+1 to 18×p. This can improve the communication efficiency and the frequency use efficiency of the entire wireless communication network. In addition, since the number of transmissions of the NDP report TFs is suppressed, information collection from the STAs compatible with the NDP report TF is completed in a short period of time. Thus, the transmission timing of a Basic TF based on the information from each STA also becomes earlier, so that it is possible to suppress the delay of UL transmission or DL transmission.

Note that the above-described Starting AID indicates the minimum value of the range of the AID, but is not limited to this. For example, the maximum value of the range of the AID may be designated. In this case, the range from (the Starting AID value−N+1) to (the Starting AID value) can be designated. Similarly, another value such as the median of the range of the AID may be designated. According to this, for example, when the AIDs are assigned in descending order, the initial value of the range of the destinations of the NDP report TF can be specified regardless of the AID assignment state at each time. That is, for example, when AIDs are assigned in descending order, the minimum value of the range to which the AIDs have been assigned changes, but the maximum value does not change. Therefore, in the NDP report TF, the maximum value of the AID can always be used as the initial value of the Starting AID. In this manner, for example, the method of designating the destinations of the NDP report TF may be determined in accordance with the method of assigning the AIDs. Further, when there are a plurality of designation methods of the destinations of the NDP report TF, information indicating the designation method to be used may be included in an arbitrary information element of the NDP report TF.

Note that in the above description, the AP 101 has been described to use a consecutive value as the AID value to be assigned from the first region, but the present invention is not limited to this. For example, the AP 101 may not assign consecutive AIDs as long as the AIDs are within a range determined based on the number of AIDs that can be designated by one NDP report TF. For example, if the number (N) of AIDs that can be designated by one NDP report TF is 18, the AP 101 first assigns AIDs in the range of 1 to 18 to the STAs compatible with the NDP report TF. For example, the AP 101 sequentially assigns the AIDs=18, 13, 5, 6, 8, 2, 15, 3, 7, 10, 9, 14, 4, 12, 11, 16, 1, 17 to the STAs that are compatible with the NDP report TF and have established the first to 18th connections, respectively. In this manner, the AP 101 assigns different AIDs of 1 to 18 to the first eighteen STAs compatible with the NDP report TF, but the values of the AIDs need not necessarily be consecutive. While the number of STAs that are compatible with the NDP report TF and have established connections is within 1 to 18, the NDP report TF is transmitted once. Accordingly, even if an inconsecutive value is assigned as the AID, as long as the value is within the range that can be designated by one NDP report TF, the number of transmissions of the NDP report TFs does not increase. Thereafter, the AP 101 may assign different AIDs within the range of the AID=19 to 36 to the STAs compatible with the NDP report TF that have established the 19th to 36th connections, respectively. Note that the size of the first region may be the number of the AIDs that can be designated by one NDP report TF. For example, if the number (N) of the AIDs that can be designated by one NDP report TF is 18, the first region may include only values of 1 to 18. In this case, by selecting the AID from the first region for the STA compatible with the NDP report TF, it is possible to designate all the STAs compatible with the NDP report TF by one NDP report TF. Note that the AP 101 may extend the first region when the number of the STAs compatible with the NDP report TF exceeds the number of the AIDs in the first region.

Note that if a predetermined period has elapsed after a connection with a certain STA is established but communication is not performed, the AID of this STA may be cleared. In this case, the AP 101 can assign the cleared AID to an STA compatible with the NDP report TF that has established a connection next. This can prevent the AID assigned from the first region from becoming inconsecutive.

In the above-described embodiment, on the premise of the AP in the IEEE 802.11ax standard, consecutive AIDs are assigned to a plurality of STAs compatible with the NDP report TF, but the present invention is not limited to this. That is, the above discussion is applicable to a communication device that can assign a predetermined setting value such as an AID to each of a plurality of partner devices and transmit a signal by designating the destinations by designating the range of the predetermined setting value. That is, in this case, the communication device assigns a consecutive value from the first range as the predetermined setting value to a first partner device complying with designation of the destinations by the range designation. On the other hand, the communication device assigns the predetermined setting value from a second range that does not overlap with the first range to a second partner device not complying with designation of the destinations by the range designation. Thus, the communication device can prevent, for a signal whose destinations are specified by designating the range of the predetermined setting value, the predetermined setting value for the second partner device from being included in that range. Also in this case, the number of transmissions of signals transmitted to a plurality of partner devices is reduced, so that the communication efficiency and the frequency use efficiency of the entire wireless communication network can be improved.

According to the present invention, the communication efficiency can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device that complies with an IEEE802.11 standard and performs communication by assigning an Association identifier (AID) to a partner device, the communication device being configured to
    determine, when the communication device establishes a connection to the partner device, the AID to be assigned to the partner device from a first range of AID values if the partner device is a first type device compatible with a frame that is transmitted with a destination designated by a range of the AID, and determine the AID to be assigned to the partner device from a second range different from the first range if the partner device is a second type device not compatible with the frame that is transmitted with the destination designated by the range of the AID,
    wherein the frame is sent to the partner devices to which the AID is assigned within the first range.

2. The communication device according to claim 1, wherein in a case where the AIDs are assigned to a plurality of the first type devices, a consecutive value is determined as the AID to be assigned to each of the first type devices.

3. The communication device according to claim 1, wherein the communication device is an access point that operates according to the IEEE 802.11ax standard.

4. The communication device according to claim 1, wherein the communication device determines whether the partner device is the first type device or the second type device based on capability information of the partner device.

5. The communication device according to claim 3, wherein the communication device determines whether the partner device is the first type device or the second type device based on whether the partner device complies with an IEEE802.11ax standard.

6. The communication device according to claim 4, wherein the determination is executed based on information included in a Probe Request, an Authentication Request, or an Association Request received from the partner device.

7. The communication device according to claim 1, wherein the frame is a Null Data Packet feedback report poll Trigger Frame.

8. A method performed by a communication device that complies with an IEEE802.11 standard and performs communication by assigning an Association identifier (AID) to a partner device, the method comprising:
    when the communication device establishes a connection to the partner device,
    determining the AID to be assigned to the partner device from a first range of AID values if the partner device is a first type device compatible with a frame that is transmitted with a destination designated by a range of the AID, and
    determining the AID to be assigned to the partner device from a second range different from the first range if the partner device is a second type device not compatible with the frame that is transmitted with the destination designated by the range of the AID,
    wherein the frame is sent to the partner devices to which the AID is assigned within the first range.

9. A non-transitory computer-readable storage medium that stores a program for causing a computer included in a communication device, which complies with an IEEE802.11 standard and performs communication by assigning an Association identifier (AID) to a partner device, to:
    when the communication device establishes a connection to the partner device,
    determine the AID to be assigned to the partner device from a first range of AID values if the partner device is a first type device compatible with a frame that is transmitted with a destination designated by a range of the AID, and
    determine the AID to be assigned to the partner device from a second range different from the first range if the partner device is a second type device not compatible with the frame that is transmitted with the destination designated by the range of the AID,
    wherein the frame is sent to the partner devices to which the AID is assigned within the first range.

* * * * *